US008841815B2

(12) United States Patent
Vuolle-Apiala et al.

(10) Patent No.: US 8,841,815 B2
(45) Date of Patent: Sep. 23, 2014

(54) ELECTRICAL MACHINE WITH GUIDE BARS FOR FACILITATING ASSEMBLY AND A METHOD FOR ASSEMBLING THE ELECTRICAL MACHINE

(75) Inventors: Tuomas Vuolle-Apiala, Jyväskylä (FI); Jorma Tirkkonen, Juväskylä (FI); Ville Pakarinen, Jyväsklyä (FI); Jari Toikkanen, Muurame (FI); Olli Liukkonen, Lappeenranta (FI); Jorma Mustalahti, Hyvinkää (FI); Ilkka Martikainen, Lappeenranta (FI)

(73) Assignees: The Switch Drive Systems Oy, Lappeenranta (FI); Moventas Gears Oy, Jyvaskyla (FI)

( * ) Notice: Subject to any disclaimer, the term of this patent is extended or adjusted under 35 U.S.C. 154(b) by 150 days.

(21) Appl. No.: 13/102,519

(22) Filed: May 6, 2011

(65) Prior Publication Data
US 2011/0273045 A1 Nov. 10, 2011

(30) Foreign Application Priority Data
May 6, 2010 (EP) .................... 10162075

(51) Int. Cl.
*H02K 5/22* (2006.01)
*H02K 15/16* (2006.01)
*H02K 1/30* (2006.01)
*H02K 5/173* (2006.01)
*H02K 15/03* (2006.01)

(52) U.S. Cl.
CPC ............... *H02K 15/16* (2013.01); *H02K 15/03* (2013.01); *H02K 1/30* (2013.01); *H02K 5/1735* (2013.01)

USPC .............................. 310/261.1; 310/91; 29/598

(58) Field of Classification Search
CPC ....... H02K 15/02; H02K 15/028; H02K 5/22; H02K 15/16
USPC ........... 310/90, 91, 92, 156.01, 261.1; 29/598
IPC ............................................. H02K 15/14, 15/16
See application file for complete search history.

(56) References Cited

U.S. PATENT DOCUMENTS

| 2,332,436 A | 10/1943 | Campbell |
| 2,436,930 A | 3/1948 | Mackmann |

(Continued)

FOREIGN PATENT DOCUMENTS

| CN | 101426661 A | 5/2009 |
| CN | 101865084 A | 10/2010 |

(Continued)

*Primary Examiner* — Michael Andrews
(74) *Attorney, Agent, or Firm* — Birch, Stewart, Kolasch & Birch, LLP (57) ABSTRACT

A method for installing a rotor of an electrical machine is disclosed. The method comprises using axially directed guide bars (107-109) for keeping the rotor (102) centered with respect to a bore of a stator (101) during the installation of the rotor. The rotor has sliding surfaces so that it can be slid in the axial direction to its final position along the guide bars. The mechanical support structure (104) that supports bearings (105, 106) of the rotor are provided with supporting surfaces for being able to give mechanical support to the guide bars. The mechanical support structure (104) may comprise for example threaded holes to which threaded ends of the guide bars can be tightened. After the rotor has been moved to its final position and it is supported by the bearings, the guide bars are removed.

4 Claims, 6 Drawing Sheets

(56) References Cited

U.S. PATENT DOCUMENTS

| | | | |
|---|---|---|---|
| 3,153,158 | A | 10/1964 | Schmitter |
| 3,310,691 | A | 3/1967 | Wilkinson |
| 3,812,928 | A | 5/1974 | Rockwell et al. |
| 4,117,359 | A | 9/1978 | Wehde |
| 4,398,110 | A | 8/1983 | Flinchbaugh et al. |
| 4,467,230 | A | 8/1984 | Rovinsky |
| 4,475,075 | A | 10/1984 | Munn |
| 4,505,031 | A * | 3/1985 | Colwell et al. ............ 29/596 |
| 4,531,428 | A | 7/1985 | Windish |
| 4,590,820 | A | 5/1986 | Hambric |
| 4,607,803 | A | 8/1986 | Nozawa |
| 4,922,164 | A | 5/1990 | Jacobsen et al. |
| 5,053,661 | A | 10/1991 | Kitamura et al. |
| 5,087,229 | A | 2/1992 | Hewko et al. |
| 5,246,082 | A | 9/1993 | Alber |
| 5,272,938 | A | 12/1993 | Hsu et al. |
| 5,770,904 | A | 6/1998 | Rasch et al. |
| 6,100,615 | A | 8/2000 | Birkestrand |
| 6,133,659 | A * | 10/2000 | Rao .............................. 310/89 |
| 6,278,216 | B1 | 8/2001 | Li |
| 6,515,399 | B1 | 2/2003 | Lauf et al. |
| 6,756,719 | B1 | 6/2004 | Chiu |
| 6,864,607 | B2 | 3/2005 | Hashimoto |
| 6,944,906 | B2 | 9/2005 | Moein et al. |
| 7,057,327 | B2 * | 6/2006 | Kanazawa et al. ............ 310/263 |
| 7,077,776 | B2 | 7/2006 | Sorab et al. |
| 7,649,286 | B2 | 1/2010 | Manning |
| 7,815,536 | B2 | 10/2010 | Jansen et al. |
| 2002/0077209 | A1 | 6/2002 | El-Antably et al. |
| 2002/0121819 | A1 * | 9/2002 | Beatty et al. ................ 310/67 R |
| 2004/0160058 | A1 | 8/2004 | Gott et al. |
| 2006/0223665 | A1 | 10/2006 | Matsushita et al. |
| 2009/0025991 | A1 | 1/2009 | Moriguchi et al. |
| 2009/0114480 | A1 | 5/2009 | Madge et al. |
| 2010/0007151 | A1 | 1/2010 | Ciszak et al. |
| 2010/0043207 | A1 * | 2/2010 | Son et al. .................... 29/598 |
| 2010/0052442 | A1 | 3/2010 | Savant |
| 2010/0062888 | A1 | 3/2010 | Ciszak et al. |
| 2010/0133854 | A1 | 6/2010 | Jansen et al. |
| 2010/0164232 | A1 | 7/2010 | Siegfriedsen |
| 2011/0133469 | A1 | 6/2011 | Jansen et al. |

FOREIGN PATENT DOCUMENTS

| | | |
|---|---|---|
| DE | 8513218 U1 | 5/1986 |
| DE | 41 34 553 A1 | 3/1992 |
| DE | 10 2007 012 408 A1 | 9/2008 |
| EP | 0538743 A2 | 4/1993 |
| EP | 0811764 A1 | 12/1997 |
| EP | 1 905 633 A1 | 4/2008 |
| EP | 2 088 316 A2 | 8/2009 |
| EP | 2 216 547 A2 | 8/2010 |
| FR | 2824965 A1 | 11/2002 |
| JP | 2009-148035 A | 7/2009 |
| WO | WO 02/095900 A1 | 11/2002 |
| WO | WO 03/031812 A1 | 4/2003 |
| WO | WO 2004/001932 A1 | 12/2003 |
| WO | WO 2005/117242 A1 | 12/2005 |
| WO | WO 2006/115132 A1 | 11/2006 |
| WO | WO 2007/051895 A1 | 5/2007 |
| WO | 2011-133024 A2 | 10/2011 |

* cited by examiner

ELECTRICAL MACHINE WITH GUIDE BARS FOR FACILITATING ASSEMBLY AND A METHOD FOR ASSEMBLING THE ELECTRICAL MACHINE

FIELD OF THE INVENTION

The invention relates to an electrical machine and to a method for assembling the electrical machine. More particularly, the method relates to installing the rotor of the electrical machine into the bore of the stator of the electrical machine.

BACKGROUND

Sometimes an electrical machine may have to be assembled or repaired at its site of normal operation, i.e. in the field conditions. For example, it may be a case that e.g. bearings of the electrical machine have to be changed and it may be too cumbersome and/or costly to move the whole electrical machine to be repaired elsewhere. Especially, installing a rotor of an electrical machine into the bore of the stator core may be a cumbersome task in field conditions. Especially, assembling a permanent magnet electrical machine may be a challenging task even in workshop circumstances because strong forces caused by the permanent magnets complicate the installation of a rotor including the permanent magnets into the bore of the stator core. In conjunction with permanent magnet electrical machines having surface mounted permanent magnets, there is a considerable risk of damaging the permanent magnets when installing the rotor into the bore of the stator core.

Publications CN101577453, JP2003143786, KR20000007669, JP8168215, and JP2223342 disclose various methods for installing permanent magnets into a rotor of a permanent magnet electrical machine. The installing of the permanent magnets into the rotor into correct positions is a challenging task because of the forces caused by the permanent magnets. However, technical solutions are needed also for overcoming the challenges related to installing of a rotor comprising permanent magnets into the bore of the stator core of a permanent magnet electrical machine. As well, the technical solutions are needed for overcoming the challenges related to installing of a rotor into the bore of the stator core of an electrically magnetized electrical machine in field conditions.

SUMMARY

In accordance with the first aspect of the present invention, there is provided a new method for assembling an electrical machine that comprises:
- a stator comprising a laminated stator core and stator windings,
- a rotor, and
- a mechanical support structure comprising bearings for supporting the rotor with respect to the stator.

The method for assembling the above-described electrical machine comprises:
- placing first ends of guide bars to the mechanical support structure so that the guide bars become axially directed,
- placing the rotor so that the rotor is capable of being slid along the axially directed guide bars,
- sliding the rotor along the guide bars in the axial direction into a bore of the stator core, the guide bars keeping the rotor centered relative to the bore of the stator core when the rotor is being slid in the axial direction, and
- removing the guide bars from the electrical machine.

As the guide bars are able to keep the rotor centered with respect to the bore of the stator core when the rotor is being slid in the axial direction into the bore of the stator core, the installation of the rotor is a straightforward operation also in field conditions. The method provides advantages especially in conjunction with permanent magnet electrical machines, where forces caused by permanent magnets complicate the installation of the rotor into the bore of the stator core. The risk of damaging the permanent magnets during the installation of the rotor is significantly reduced or even eliminated because the guide bars keep the rotor centered relative to the bore of the stator core. The axial direction mentioned above is the direction of the rotational axis of the rotor.

In accordance with the second aspect of the present invention, there is provided a new electrical machine the rotor of which can be installed using the above-described method. The electrical machine according to the second aspect of the invention comprises:
- a stator comprising a laminated stator core and stator windings,
- a rotor, and
- a mechanical support structure comprising bearings for supporting the rotor with respect to the stator, wherein the mechanical support structure comprises supporting surfaces stationary with respect to the stator and suitable for supporting axially directed guide bars and the rotor comprises sliding surfaces suitable for allowing the rotor to be installed into a bore of the stator core by sliding the rotor in an axial direction along the guide bars which, during the installation, are capable of keeping the rotor sufficiently centered relative to the bore of the stator core, and which, after the installation, are capable of being removed, and wherein the bearings are capable of supporting the rotor with respect to the stator after removal of the guide bars.

The electrical machine can be, for example, a permanent magnet electrical machine wherein the rotor comprises permanent magnets.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in dependent claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1A:
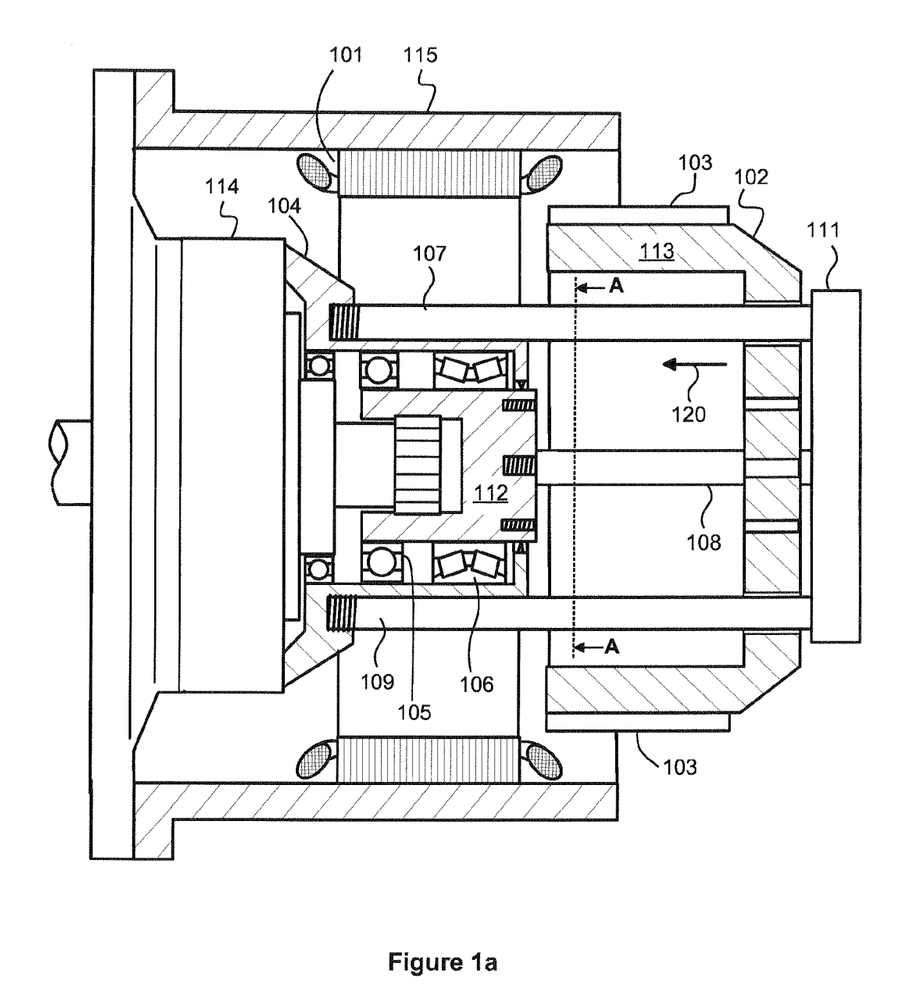
FIG. 1a shows a schematic section view of an electrical machine according to an embodiment of the invention in a situation in which a rotor is being installed.
Figure 1B:
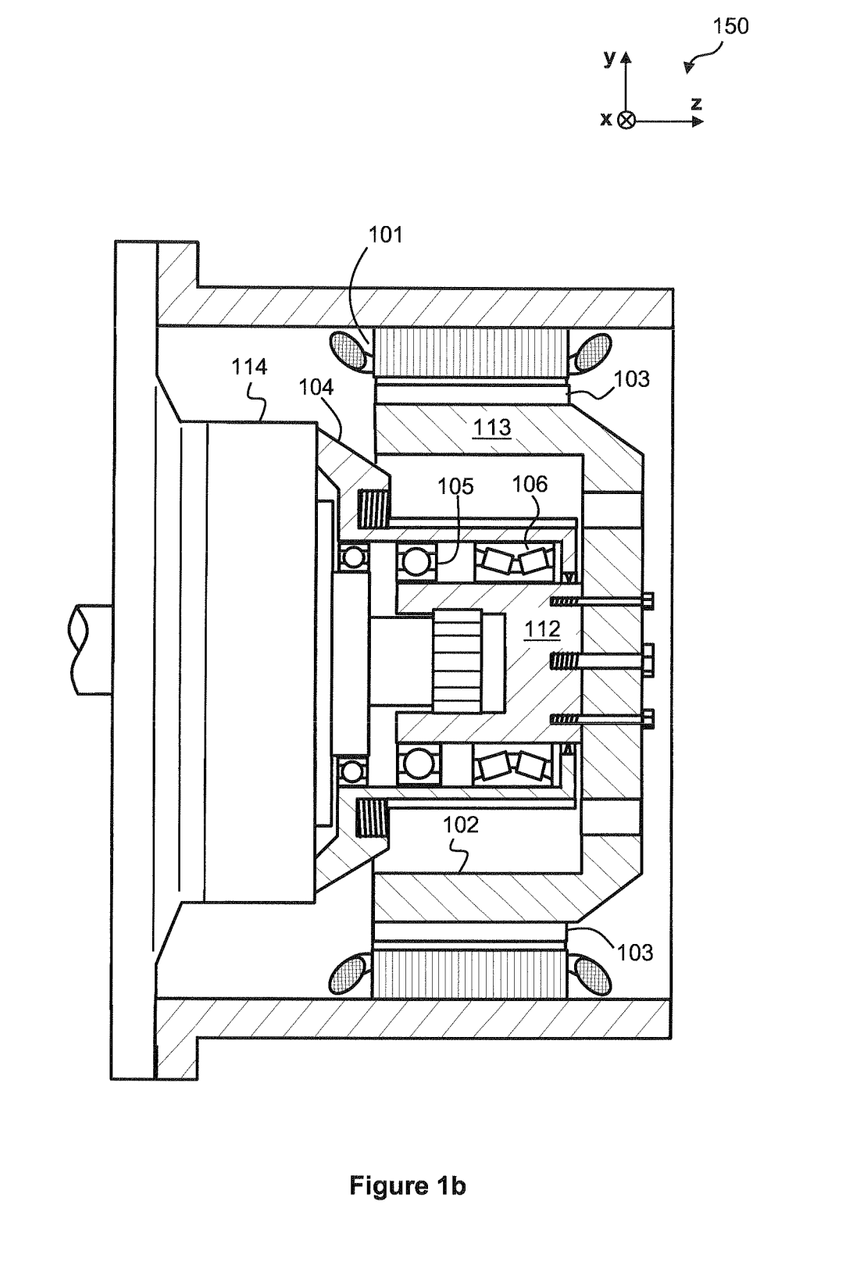
FIG. 1b shows a schematic section view of the electrical machine shown in FIG. 1a in a situation in which the rotor has been installed.
Figure 1C:
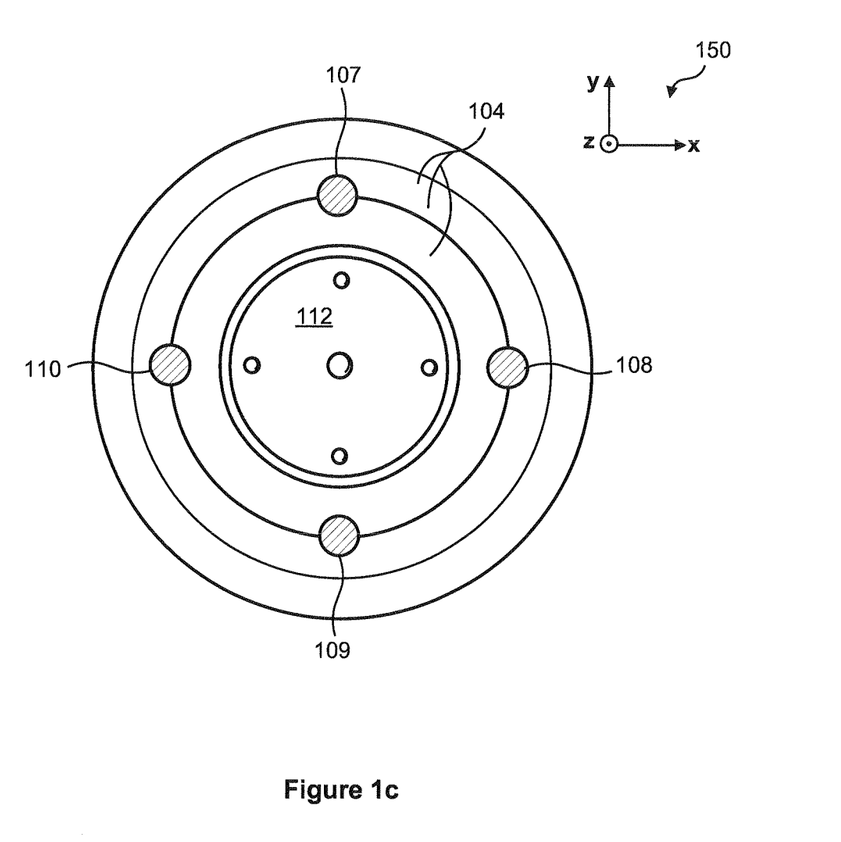
FIG. 1c shows a view of the section taken along the line A-A shown in FIG. 1a, FIG. 1d shows a rotor of an electrical machine according to an embodiment of the invention.

FIG. 1a shows a schematic section view of an electrical machine according to an embodiment of the invention in a situation in which a rotor is being installed and FIG. 1b shows a schematic section view of the electrical machine in a situation in which the rotor is in its final position. FIG. 1c shows a view of the section taken along the line A-A shown in FIG. 1a. In FIGS. 1a-1c, the axial direction is the direction of the z-axis of the coordinate system 150. The electrical machine comprises a stator 101 that includes a laminated stator core and stator windings. The rotor 102 of the electrical machine comprises a frame 113 and permanent magnets 103 that are attached to the frame 113. The electrical machine comprises a mechanical support structure 104 comprising bearings 105 and 106 arranged to support the rotor with respect to the stator when the rotor has been installed to its normal position as shown in FIG. 1b. In the exemplifying construction shown in FIGS. 1a-1c, the mechanical support structure 104 is connected to (or is a part of) a frame structure of a gear stage 114 integrated with the electrical machine. The gear stage can be e.g. a planet gear stage. It should be, however, noted that from the viewpoint of the principle of the present invention it is immaterial whether or not there is any integrated gear stage. For example, the mechanical support structure 104 could as well be directly attached to an outer frame 115. The bearings shown in FIGS. 1a and 1b are rolling bearings. It should be, however, noted that any of the bearings could be a sliding bearing as well.

The mechanical support structure 104 comprises supporting surfaces suitable for supporting axially directed guide bars 107, 108, 109 and 110. In the exemplifying construction shown in FIGS. 1a-1c, the mechanical support structure 104 comprises threaded holes into which the treaded ends of the guide bars can be tightened. FIG. 1a shows only the guide bars 107-109, but FIG. 1c shows cross sections of all the guide bars 107-110. The rotor 102 comprises sliding surfaces suitable for allowing the rotor to be installed into a bore of the stator core by sliding the rotor in the direction of an arrow 120, i.e. the axial direction, along the guide bars which, during the installation, are capable of keeping the rotor sufficiently centered relative to the bore of the stator core. In the exemplifying construction shown in FIGS. 1a-1c, the frame 113 comprises apertures for the guide bars. In the situation shown in FIG. 1a, the surfaces of the apertures face towards the guide bars and thereby the surfaces of the apertures represent the sliding surfaces of the rotor. A support element 111 can be used to keep the ends of the guide bars at pre-determined positions with respect to each other so as to further improve the ability of the guide bars to keep the rotor centered relative to the bore of the stator core.

Figure 1D:
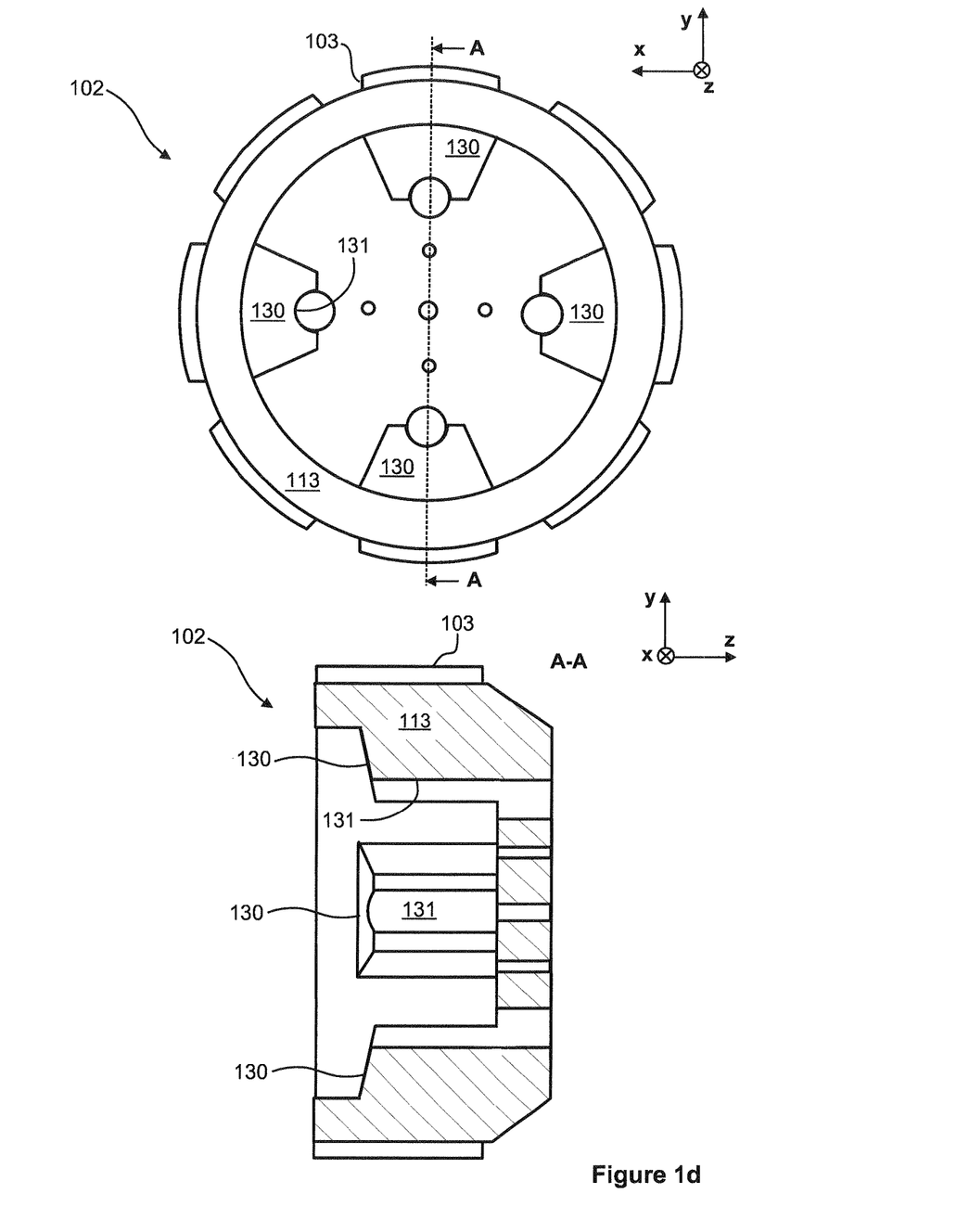

The principle of using the guide bars for assisting the installation of the rotor can be implemented with various mechanical arrangements. For example, it is not necessary to provide the mechanical support structure 104 with the threaded holes or with other cavities for the ends of the guide bars. The guide bars are sufficiently supported also, for example, in a case in which there are axially directed grooves on the surface of the mechanical support structure as illustrated in FIG. 1a-1c and the support element 111 is used. Furthermore, as illustrated in FIG. 1d, the inner walls of the frame 113 can be provided with e.g. projections 130 having axially directed grooves 131 which, together with corresponding axially directed grooves in the mechanical support structure 104, form channels for the guide bars and thereby support the guide bars.

The above illustrated principle of using the guide bars for assisting the installation of the rotor is advantageous since the guide bars are supported by the same mechanical support structure 104 that is used for arranging the bearings of the rotor. Thus, the guidance for the installation can be co-centric with the bearings 105 and 106 of the rotor.

The guide bars 107-110 which are used for supporting the rotor during installation can also be used for locking the rotor 102 in a fixed position with respect to the stator 101 for example during transportation of the electrical machine, i.e. the guide bars can be used as a transportation support for protecting the electrical machine during transportation e.g. shipping.

Figure 2:
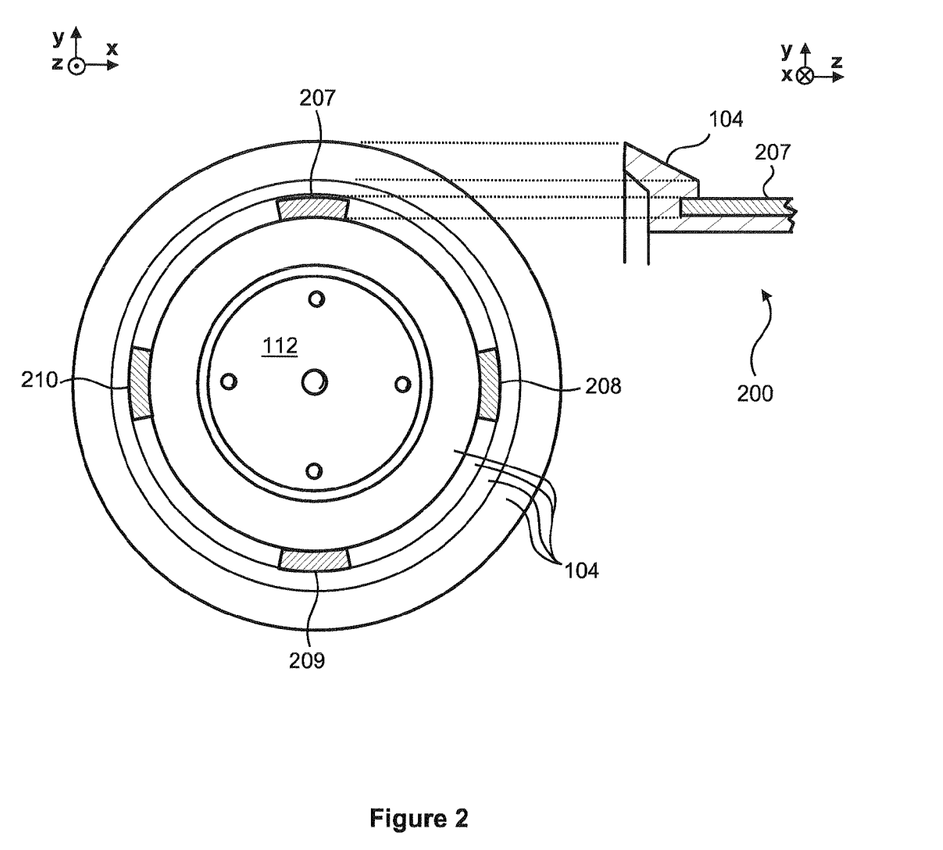
FIG. 2 illustrates guide bars having a different cross-section than those shown in FIG. 1c.

In the exemplifying cases described above, the guide bars 107-110 have a circular cross section. FIG. 2 illustrates a case in which there are guide bars 207, 208, 209, and 210 having a non-circular cross section. As illustrated in a partial side section view 200, the mechanical support structure 104 may comprise a cavity or cavities for receiving the ends of the guide bars.

In the exemplifying construction illustrated in FIGS. 1a-1c, the rotor comprises a separate center part 112 to which the frame 113 of the rotor is attached as shown in FIG. 1b. It should be, however, noted that the frame 113 and the center part 112 could also be a single, monolithic piece. Furthermore, as evident to a skilled person, the above-described principle of using guide bars for keeping the rotor centered with respect to the bore of the stator core during installation can be applied in conjunction with many different constructions of electrical machines. FIGS. 1a-1d relate to a case where the electrical machine is a permanent magnet electrical machine. However, as evident to a skilled person, the electrical machine does not necessarily have to be a permanent magnet electrical machine. Despite the above-described principle based on the guide bars provides most of its advantages in conjunction with permanent magnet electrical machines, this principle is applicable also with electrically magnetized electrical machines.

Figure 3:
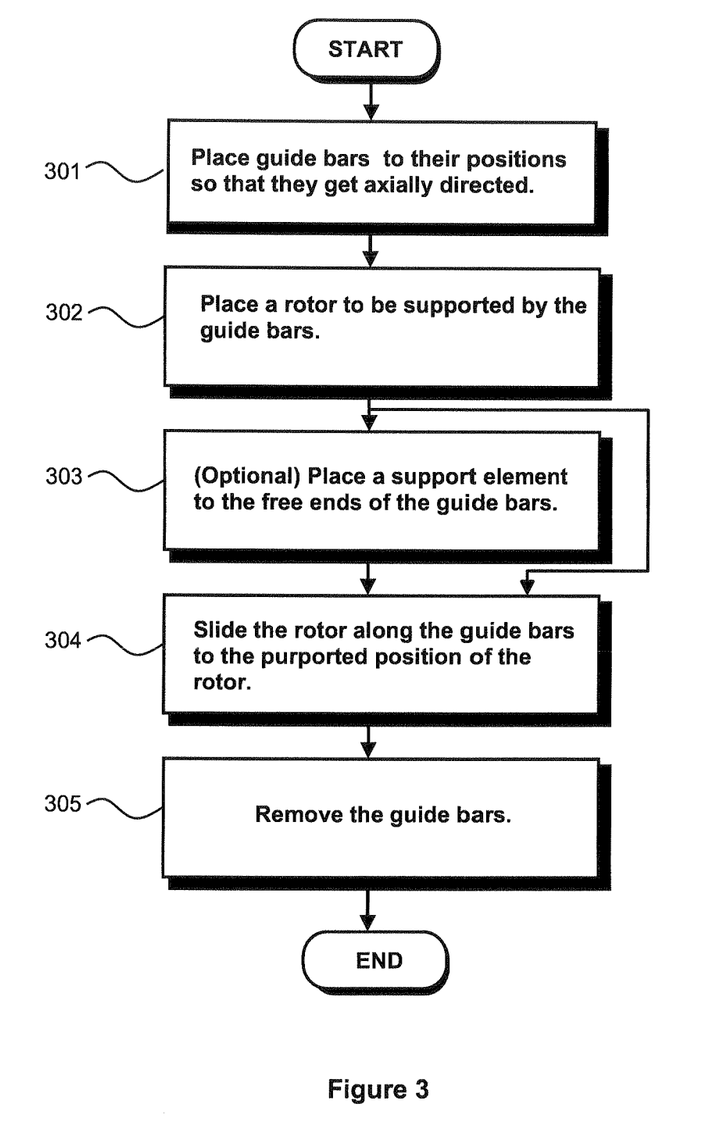
FIG. 3 shows a flow-chart of a method according to an embodiment of the invention for assembling an electrical machine.

FIG. 3 shows a flow-chart of a method according to an embodiment of the invention for assembling an electrical machine that comprises:
- a stator comprising a laminated stator core and stator windings,
- a rotor, and
- a mechanical support structure comprising bearings for supporting the rotor with respect to the stator.

The method comprises:
- placing, in the method phase 301, first ends of guide bars to the mechanical support structure so that the guide bars become axially directed,
- placing, in the method phase 302, the rotor so that the rotor is capable of being slid along the axially directed guide bars,
- sliding, in the method phase 304, the rotor along the guide bars in the axial direction into a bore of the stator core, the guide bars keeping the rotor centered relative to the bore of the stator core when the rotor is being slid in the axial direction, and
- removing, in the method phase 305, the guide bars from the electrical machine.

In a method according to an embodiment of the invention, the first end of each guide bar is pushed into a cavity of the mechanical support structure.

In a method according to an embodiment of the invention, the first end of each guide bar is threaded and is tightened into a corresponding threaded hole of the mechanical support structure.

A method according to an embodiment of the invention further comprises placing, in the optional method phase 303, a support element to second ends of the guide bars for keeping the second ends of the guide bars at pre-determined positions with respect to each other so as to further improve the ability of the guide bars to keep the rotor centered relative to the bore of the stator core.

In a method according to an embodiment of the invention, the rotor comprises permanent magnets.

There is also provided a new method for providing an electrical machine with a transportation support, the electrical machine comprising:
- a stator comprising a laminated stator core and stator windings,
- a rotor, and
- a mechanical support structure comprising bearings for supporting the rotor with respect to the stator.

The method for providing the electrical machine with the transportation support comprises:
- placing first ends of guide bars to the mechanical support structure so that the guide bars become extending in the axial direction through apertures of the rotor so as to lock the rotor in a fixed position with respect to the stator.

The specific examples provided in the description given above should not be construed as limiting. Therefore, the invention is not limited merely to the embodiments described above.

What is claimed is:

1. An electrical machine comprising:
    a stator comprising a laminated stator core and stator windings, a rotor, and
    a mechanical support structure comprising bearings for supporting the rotor with respect to the stator,
    wherein the mechanical support structure comprises supporting surfaces stationary with respect to the stator and suitable for supporting axially directed guide bars, and
    the rotor comprises sliding surfaces suitable for allowing the rotor to be installed into a bore of the stator core by sliding the rotor in an axial direction along the guide bars which, during an installation of the rotor, are capable of keeping the rotor centered relative to the bore of the stator core, and which, after the installation of the rotor, the guide bars are capable of being removed, and
    wherein the bearings are capable of supporting the rotor with respect to the stator after removal of the guide bars.

2. An electrical machine according to claim 1, wherein the mechanical support structure comprises a cavity or cavities for receiving ends of the guide bars.

3. An electrical machine according to claim 1, wherein the mechanical support structure comprises threaded holes for receiving treaded ends of the guide bars.

4. An electrical machine according to claim 1, wherein the rotor comprises permanent magnets.

\* \* \* \* \*

UNITED STATES PATENT AND TRADEMARK OFFICE
CERTIFICATE OF CORRECTION

PATENT NO. : 8,841,815 B2
APPLICATION NO. : 13/102519
DATED : September 23, 2014
INVENTOR(S) : Tuomas Vuolle-Apiala et al.

It is certified that error appears in the above-identified patent and that said Letters Patent is hereby corrected as shown below:

ON THE TITLE PAGE:

At item (75), Inventors, change "Jorma Tirkkonen, Juväskylä (FI); Ville Pakarinen, Jyväsklyä" (FI)" to --Jorma Tirkkonen, Jyväskylä (FI); Ville Pakarinen, Jyväskylä (FI)--.

At item (73), Assignees, change "Moventas Gears Oy, Jyvaskyla (FI)" to --Moventas Gears Oy, Jyväskylä (FI)--.

Signed and Sealed this
Tenth Day of February, 2015

Michelle K. Lee
*Deputy Director of the United States Patent and Trademark Office*